United States Patent [19]

McGill et al.

[11] Patent Number: 4,519,993

[45] Date of Patent: * May 28, 1985

[54] PROCESS OF CONVERSION FOR DISPOSAL OF CHEMICALLY BOUND NITROGEN IN INDUSTRIAL WASTE GAS STREAMS

[75] Inventors: Eugene C. McGill, Skiatook; Ronald D. Bell, Tulsa, both of Okla.

[73] Assignee: McGill Incorporated, Tulsa, Okla.

[*] Notice: The portion of the term of this patent subsequent to Sep. 20, 2000 has been disclaimed.

[21] Appl. No.: 523,644

[22] Filed: Aug. 15, 1983

Related U.S. Application Data

[63] Continuation-in-part of Ser. No. 348,840, Feb. 16, 1982, Pat. No. 4,405,587.

[51] Int. Cl.$^3$ .................. C01B 21/00; B01D 47/00
[52] U.S. Cl. .................. 423/235; 423/210; 423/212; 431/4; 431/10
[58] Field of Search .......... 423/235, 235 D, 239 A, 423/239, 210.5, 210 C, 212, 351; 431/4, 10

[56] References Cited

U.S. PATENT DOCUMENTS

| | | | |
|---|---|---|---|
| 3,860,384 | 1/1975 | Vulliet et al. | 423/235 |
| 3,867,507 | 2/1975 | Myerson | 423/235 |
| 3,873,671 | 3/1975 | Reed et al. | 423/235 |
| 3,911,083 | 10/1975 | Reed et al. | 423/235 |
| 4,144,313 | 3/1979 | Germerdonk et al. | 423/210 C |
| 4,244,325 | 1/1981 | Hart et al. | 423/235 |
| 4,316,878 | 2/1982 | Akune et al. | 423/235 |
| 4,405,587 | 9/1983 | McGill et al. | 423/235 |

FOREIGN PATENT DOCUMENTS

| | | | |
|---|---|---|---|
| 54-50470 | 4/1979 | Japan | 423/235 |
| 54-38431 | 11/1979 | Japan | 423/235 |
| 667342 | 2/1952 | United Kingdom | 423/235 |

*Primary Examiner*—Gregory A. Heller
*Attorney, Agent, or Firm*—Bill D. McCarthy

[57] ABSTRACT

An improved process for disposal of chemically bound nitrogen in industrial waste streams is provided wherein a effluent stream containing chemically bound nitrogen, such as ammonia stream, is contacted with an effective amount of oxygen containing gas and a stoichiometric excess of a hydrocarbon, based on the total amount of available oxygen, at a temperature greater than about 2000° F. or less than 3000° F., to provide a combustion effluent. The combustion effluent is thereafter contacted with an effective amount of a gaseous stream containing less oxygen than that which supports flame propagation at a temperature in the range of from about 1600° F. to about 1800° F., to substantially oxidize all combustibles present in the combustion effluent and provide an oxidation effluent substantially free of oxides of nitrogen ($NO_x$) and combustibles. The oxidation effluent may be cooled in heat exchange equipment to recover energy, recycled to support the combustion and/or the oxidation of the combustibles, or vented to the atmosphere.

22 Claims, 2 Drawing Figures

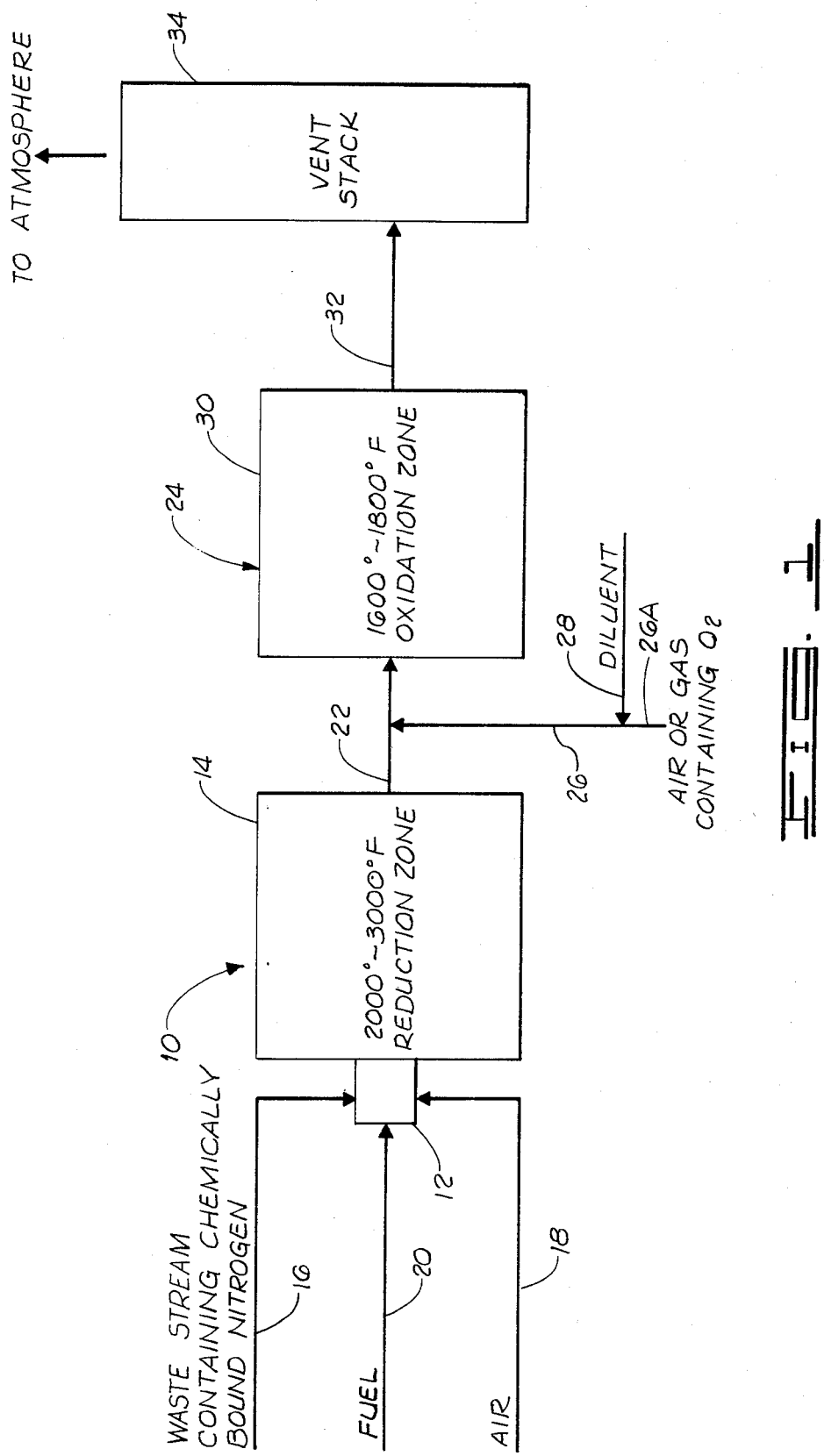

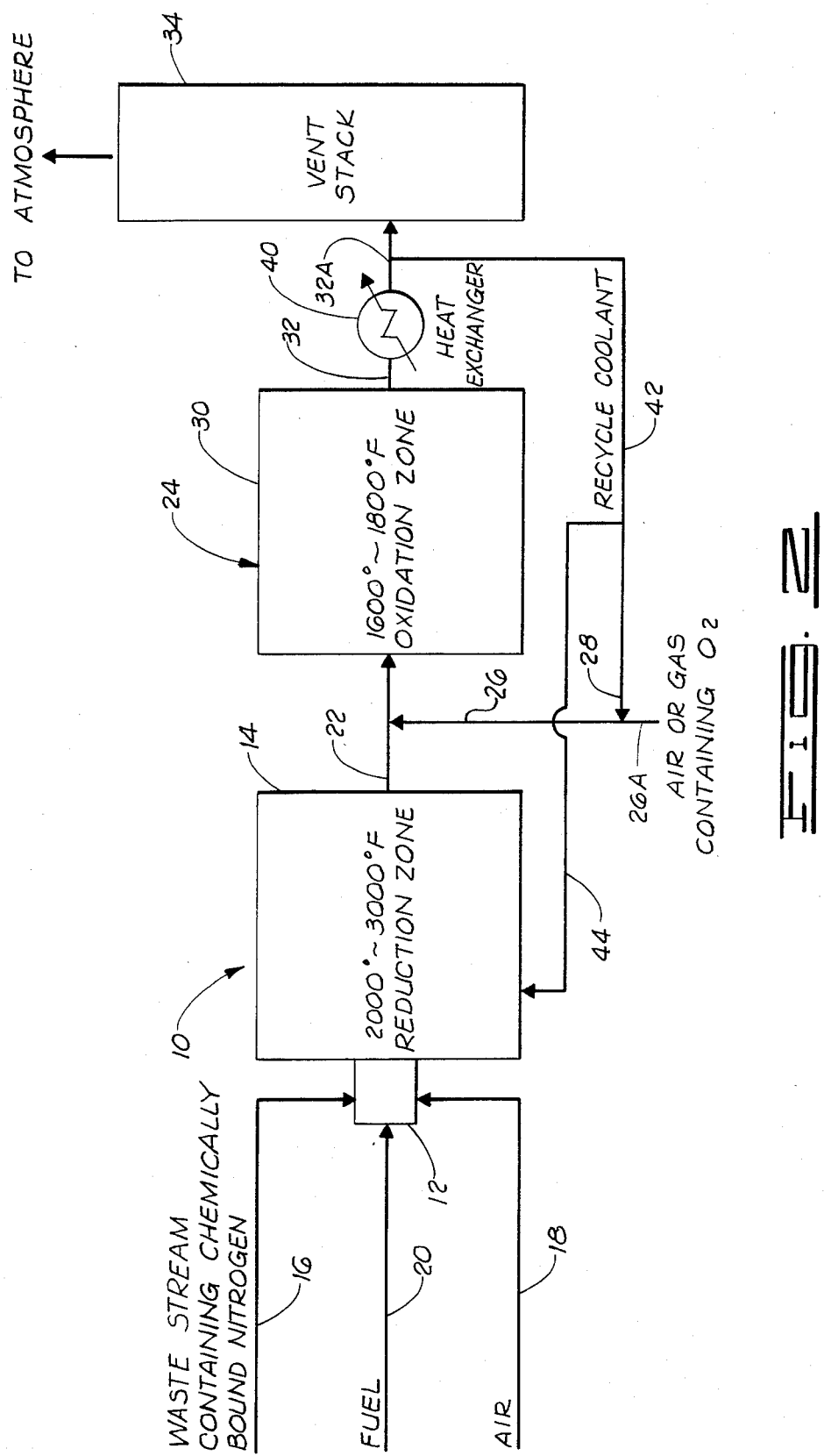

PROCESS OF CONVERSION FOR DISPOSAL OF CHEMICALLY BOUND NITROGEN IN INDUSTRIAL WASTE GAS STREAMS

CROSS REFERENCE TO RELATED APPLICATION

This is a continuation-in-part application of a U.S. patent application entitled "Process for Reduction of Oxides of Nitrogen", application Ser. No. 348,840, filed Feb. 16, 1982, and now U.S. Pat. No. 4,405,587.

BACKGROUND OF INVENTION

1. Field of the Invention

The present invention relates to the disposal of industrial waste streams, and more particularly but not by way of limitation, to an improved process for disposing of industrial waste streams containing chemically bound nitrogen.

2. Brief Statement of the Prior Art

Oxides of nitrogen and principal contaminants emitted by process combustion of industrial waste gas streams. In every combustion process, the high temperatures at the burner result in the fixation of some oxides of nitrogen. These compounds are found in stack gases mainly as nitric oxide (NO), with lesser amounts of nitrogen dioxide ($NO_2$) and traces of other oxides. Since nitric oxide continues to oxidize to nitrogen dioxide in air at ordinary temperatures, there is not a way to predict with accuracy the amount of each compound separately present in vented gases at a given time. Thus, the total amount of nitric oxide plus nitrogen dioxide in a sample is determined and referred to as "oxides of nitrogen", sometimes designated as nitrogen oxides or $NO_x$.

Emissions of nitrogen oxides from stack gases, through atmospheric reactions, produce "smog" that stings eyes and causes acid rain. For this reason, the amount of nitrogen oxides present in gases vented to the atmosphere is regulated by various state and federal agencies.

There have been considerable efforts in the art to find ways to remove or prevent the formation of nitrogen oxides in waste gases so that the waste gases may be discharged to the atmosphere without harm to the environment. One prior art process for removing nitrogen oxides from waste streams utilizes an absorption medium to absorb the oxides of nitrogen. However, this method results in the formation of either an acidic liquid or other nitrogen containing noxious liquid streams which must be treated further before they can safely be discharged into the environment.

Other processes heretofore known for removing $NO_x$ from, or preventing the formation of $NO_x$ in, waste gas streams so that such waste streams can be safely vented to the atmosphere have employed catalysts in combination with reducing gases to selectively remove $NO_x$ from gaseous streams. Still other processes have employed ammonia, ammonium formate, ammonium oxalate, ammonium carbonate and the like for selectively reducing the $NO_x$ in gaseous streams.

Another prior art process for reducing the amount of $NO_x$ in industrial waste gases employs the concept of reducing the nitrogen oxides in the presence of an excess of a hydrocarbon at elevated temperatures. Such a process effectively reduces the amount of $NO_x$ present in the waste gases to a level that is satisfactory for release to the atmosphere. However, by-products, such as carbon monoxide, hydrogen and particulate carbon, are produced in such quantities that the release of the waste gases containing these by-products is harmful to the environment unless additional steps are taken to further treat the waste gases.

One process employed to reduce the amount of $NO_x$ in gaseous streams so that the gaseous streams can be vented to the surrounding atmosphere without contamination of the environment is disclosed in U.S. Pat. No. 3,873,671, issued to Reed et al. and entitled "Process for Disposal of Oxides of Nitrogen". The Reed process provides for the burning of a hydrocarbon fuel with less than the stoichiometric amount of oxygen. The oxygen may be supplied by air, or by a stream of air containing oxides of nitrogen. The combustion products of the hydrocarbon fuel are then mixed with gases to be treated containing $NO_x$ in a ratio which provides an excess of oxidizable material, under conditions that enable a portion of the combustible products to be oxidized by oxygen made available from the decomposition of the $NO_x$, thus reducing the $NO_x$ content. This combined combustion mixture of nitrogen and other compounds, i.e., carbon monoxide, hydrocarbons, and other oxidizable materials, is thereafter cooled to a temperature in the range of from about 2000° F. to about 1200° F. with a cooling fluid which is substantially free of oxygen. To prevent venting excess combustibles into the atmosphere, the cooled mixture of nitrogen, combustion products and other oxidizable materials is thereafter mixed in a second zone with sufficient oxygen to convert substantially all of the oxidizable combustion products remaining to carbon dioxide and water while minimizing the reformation of oxides of nitrogen.

The process set forth in U.S. Pat. No. 3,873,671 possesses several inherent limitations. For example, the process is limited in that the reduction of the oxides of nitrogen occurs in the temperature range of about 2000° F. to 1200° F. In this temperature range, certain hydrocarbon fuels such as fuel oils heavier than No. 2 fuel oil, aromatic compounds, unsaturated hydrocarbons, and long chain hydrocarbons generally, will not be completely oxidized to combustible components, and the subsequent decomposition of nitrogen oxides to nitrogen will not be strongly favored. Further, if the combustible gases are cooled below about 1400° F., the oxidation of these combustibles by oxygen in the second oxidation zone may not be adequately achieved because the combustible components are greatly diluted by nitrogen, carbon dioxide and water vapor. As a result, if these combustible components are not fully oxidized due to this dilution, carbon, carbon monoxide and hydrogen will be present in the vent gases. And if these combustible vent gases are recycled to quench the reducing zone and/or the second oxidation zone, combustion can occur within the recycle stream and subsequently in the stack. Such occurrences are extremely hazardous, and can result in damage to equipment, creating dangerous conditions to operating personnel.

Another process employed to reduce the amount of $NO_x$ in gaseous waste streams is that disclosed in Japanese Patent Application No. Showa 54-50470, published Apr. 20, 1979. In this process a primary fuel is initially burned to produce a waste gas contianing $NO_x$ and at least 1% excess oxygen; a secondary light petroleum fuel, such as a light hydrocarbon or kerosene, is then introduced into the primary combustion gases to reduce the $NO_x$ therein to elemental nitrogen and more excessively reduced forms of nitrogen such as HCN and $NH_3$ at a temperature of 1300–1800 F.; and these excessively reduced nitrogen compounds are then reoxidized back to elemental nitrogen in one or more third stages with an oxygen-containing gas.

The above-described Japanese system is cumbersome, inefficient, complicated and difficult to control, for it overreduces the nitrogen present and then corrects this over-reduction by re-oxidation in an extra stage.

While there thus have been considerable efforts to find effective ways to remove, or prevent the formation of, nitrogen oxides in waste gases so that the waste gases can be discharged into the atmosphere without harm to the environment, new and improved processes are constantly being sought which will eliminate the deficiencies of the prior art processes, which are safe to operate, and which meet the increasingly stringent regulatory requirements being placed on vented waste gases by federal and state agencies.

SUMMARY OF THE INVENTION

The present invention provides an improved process for reducing the concentration of chemically bound nitrogen in a combustion effluent. Broadly, the process comprises the steps of: contacting a waste stream containing chemically bound nitrogen with an effective amount of an oxygen-containing gas and a stoichiometric excess of a reducing agent under combustion conditions to yield a temperature greater than about 2000 F. and provide a combustion effluent substantially free of chemically bound nitrogen; and then contacting the combustion effluent with an effective amount of a gaseous stream containing less than the amount of oxygen or less than the amount of oxidizable materials necessary to propagate a flame therein, at a temperature which minimizes the formation of $NO_x$ in the oxidation zone.

More specifically, and by way of example, the process of the present invention comprises contacting a chemical waste stream containing chemically bound nitrogen with an effective amount of a combustion-supporting oxygen-containing gas and with a stoichiometric excess of a hydrocarbon fuel, based on the total amount of available oxygen, at a temperature greater than about 2000 F. and less than about 3000 F., to achieve reduction of the available oxygen and provide a combustion effluent; and then contacting the combustion effluent with an effective amount at an effective temperature of an oxygen-containing, non-flame-propagating gaseous stream, to bring about oxidation of the combustion effluent at a temperature in a range of from about 1600 F. to about 1800 F. The effluent from this oxidation is substantially free of $NO_x$ and may be cooled in heat exchange equipment to recover energy prior to venting it to the atmosphere.

An object of the present invention is to provide a process for converting waste streams containing chemically bound nitrogen into streams which can be vented safely into the atmosphere without harm to the environment.

Another object of the present invention is to provide an improved process for reducing the formation of $NO_x$ during the combustion of waste streams containing chemically bound nitrogen.

Another object of the present invention is to reduce the $NO_x$ content of chemical waste streams by a process which does not suffer from the deficiencies of known processes.

Other objects, advantages and features of the present invention will become apparent from a reading of the following description taken in conjunction with the accompanying drawings and appended claims.

BRIEF DESCRIPTION OF THE DRAWINGS

The drawings which accompany the present disclosure and descriptions thereof are merely illustrative of the invention, the precise scope of which is as defined in the appended claims. Further, auxiliary equipment, such as valves, flow meters and the like, has been omitted from the drawings for the sake of clarity, since a description of such equipment is not required for an understanding of the invention.

FIG. 1 is a schematic flow diagram depicting the process of the present invention for reducing the amount of $NO_x$ in a combustion effluent produced by the combustion of an industrial waste stream containing chemically bound nitrogen; and FIG. 2 is a schematic flow diagram showing the process of the present invention for reducing the amount of $NO_x$ in a combustion effluent of an industrial waste stream containing chemically bound nitrogen wherein a heat exchange and recycle effluent are employed.

DESCRIPTION

The present invention relates to an improved process for reducing the amount of nitrogen oxides ($NO_x$), the present process comprising the combustion of industrial waste streams containing chemically bound nitrogen so that the combustion products of the present process may be vented into the atmosphere without harm to the environment. Liquid or gaseous streams containing chemically bound nitrogen can be treated using the process of the present invention. Illustrative of such streams are: $NO_x$ bearing waste streams; ammonia waste streams; coke oven gases; nitration process gases; and the waste streams of a nitroparaffin plant and its offsites.

The composition of the chemical waste streams such as mentioned above will vary substantially. However, all these streams contain chemically bound nitrogen which, when subjected to a combustion process, produces nitrogen oxides ($NO_x$). Further, while such streams are suitable for injection into a combustion chamber in the presence of hydrocarbon fuels, they frequently contain components which make their direct atmospheric discharge environmentally unacceptable.

For the purpose of the present disclosure, the term "chemically bound nitrogen" is to be understood to include compounds of nitrogen with hydrogen, oxygen or carbon, singly or in combination, as for example, nitrogen oxides, ammonia, nitromethane, acetonitrile, propionitrile, urea and the like.

Before describing the present invention with reference to the appended drawings, a discussion of the nature of combustion processes may be helpful to an understanding of the process disclosed herein. The present invention deals with the process of combustion. However, when this concept is approached, it becomes important for clarity that the concept of flame propagation be understood. Throughout history man has been intrigued with the phenomenon of nature whereby a fuel is mixed with air in the presence of an ignition source to produce a flame. As engineers and scientists have analyzed this phenomenon, certain parameters have been discovered that establish the criteria for a flame to exist.

In general, certain concentrations of fuel and oxygen must co-exist in the presence of an ignition source for a flame to propagate. To be more specific, the "lower flammability limit" is the minimum concentration of an oxidizable gas in air or oxygen below which propagation of flame does not occur upon contact with the ignition source. Similarly, the "upper flammability limit" is the maximum concentration of oxidizable gas in air or oxygen, above which flame propagation does not occur. The source of ignition must usually be one which will create a localized temperature in the mixture of oxidizable gas in air or oxygen above the minimum ignition temperature. This results in rapid oxidation and flame propagation within the concentration ranges set by the lower and upper flammability limits.

To contain or confine oxidation within a controlled combustion zone and prevent its transmission outside the zone, it is important that the concentration of the oxygen or combustibles in any stream entering the zones be reduced to such a level that flame propagation outside the combustion zone is avoided.

The oxygen and/or fuel concentrations within a stream required to prevent flame propagation through that stream will depend upon the combustibles present as well as the nature of inerts. In general, organic combustible mixtures will not propagate a flame within them if the oxygen in these mixtures is below about 13 and 15 volume percent respectively, for nitrogen and carbon dioxide as the inert gas component, and for a complicated molecular compound such as acetone for the fuel. For a simpler fuel molecule such as methane or propane, the oxygen requirement is reduced a little, to about 12 and 14 volume percent, and for a diatomic molecule such as hydrogen or carbon monoxide as the fuel, the oxygen must be reduced quite a bit further, to about 5 and 6%. Flame-propagation oxygen and fuel requirements for typical combustibles at ambient conditions are given in Table I.

TABLE I

| | Min. % $O_2$ for Flame Propagation | | Min. % Fuel for Flame Propagation (Lower Explosive Limit) |
|---|---|---|---|
| | $N_2$ diluent | $CO_2$ diluent | |
| Methane | 12.1 | 14.6 | 5.3 |
| Propane | 11.4 | 14.3 | 2.4 |
| Acetone | 13.5 | 15.6 | 3.0 |
| Carbon monoxide | 5.6 | 5.9 | 12.5 |
| Hydrogen | 5.0 | 5.9 | 4.1 |

Increases in temperature and pressure above ambient will reduce somewhat but not markedly the oxygen content required to permit flame propagation.

With the above comments respecting the principles of fuel combustion and flame propagation in mind, the present invention will now be described with reference to the drawings, wherein like numerals are used to identify like components. In FIG. 1, a reduction zone 10 is depicted schematically which comprises a burner 12 and a refractory lined steel reaction shell 14. A stream 16 containing chemically bound nitrogen, such as a gaseous stream containing nitrogen oxides, is supplied to the burner 12 via a conduit. The stream 16 may also contain combustible hydrocarbons. To maintain the reduction zone 10 at the desired temperature above about 2000 F., and to insure reduction of the chemically bound nitrogen, an air stream 18 and a fuel stream 20 are also injected into the burner 12 via conduits.

The fuel can be any suitable hydrocarbon or other reducing agent which is preferably substantially completely oxidized to carbon dioxide and water upon combustion. For example, the fuel 20 injected into the burner 12 of the reduction zone 10 can comprise paraffinic, olefinic, or aromatic hydrocarbon compounds, including mixtures thereof, such as gasoline and fuel oil; oxygenated hydrocarbons such as aldehydes, ketones or acids; or nitrated hydrocarbons and similar compounds. Desirably, the fuel 20 will have a low molecular weight, and comprise, for example, methane, ethane, and mixtures thereof, such as natural gas.

The amount and rate of injection of fuel into the burner 12 of the reduction zone 10 can vary widely and will depend to a large extent upon the amount of hydrocarbon component present in the chemical waste stream being processed. To insure substantially complete reduction of the chemically bound nitrogen in the reduction zone 10, the fuel 20 is injected into the burner 12 in an amount sufficient to effect a stoichiometric excess of the hydrocarbons component, based on the amount of available oxygen, in the reduction zone 10. However, practice has indicated that the amount of fuel 20 injected into the burner 12 should not exceed 200 percent of the stoichiometric requirement based on the amount of available oxygen to reduce the chemically bound nitrogen present in the waste steam.

As previously stated, to insure reduction of the chemically bound nitrogen in the reduction zone 10, the temperature of the reduction zone 10, and thus the effective reaction temperature of the components therein, is maintained at a level above about 2000 F. In recognition of equipment limitations, it is generally desirable that the temperature of the reduction zone be controlled so as to be less than about 3000 F. Therefore, the effective temperature range at which the reduction zone 10 is maintained is greater than about 2000 F. but less than about 3000 F. to insure that the chemically bound nitrogen present in the waste stream 16 reacts with the air stream 18 and the fuel stream 20 to form such constituents as nitrogen, carbon dioxide, and water vapor, and such intermediate combustibles as hydrogen and carbon monoxide.

A combustion effluent 22 is discharged from the reduction zone 10 and forms a reduction product stream which is composed primarily of nitrogen, carbon dioxide, water vapor, and intermediate combustibles, principally hydrogen and carbon monoxide formed as a result of the dissociation and partial oxidation of the excess fuel present in the reduction zone 10. The combustion effluent 22 is withdrawn from the reduction zone 10 via a conduit and passes to an oxidation zone 24.

The combustion effluent 22, prior to introduction into the oxidation zone 24, is mixed with an oxygen-containing gaseous stream 26 supplied via a conduit to provide a stoichiometric excess of oxygen, relative to the amount of combustibles present in the combustion effluent 22, and which at the same time, provides a reaction temperature in the oxidation zone 24 of between about 1600° F., and to about 1800 F. By controlling the concentration of oxygen in the gaseous stream 26, and thereby controlling the amount of the oxygen mixed with the combustion effluent 22, the temperature in the oxidation zone 24 can be controlled within the desired range of between about 1600 F. to about 1800 F., and all of the combustibles present in the combustion effluent 22 can be fully oxidized.

For reasons which will be set forth in more detail hereinafter, the oxygen-containing gaseous stream 26 is desirably a diluted gaseous stream containing an effective amount of oxygen but insufficient to propagate a flame in stream 26. The gaseous stream 26 may be an air stream or oxygen-bearing gas stream 26A which is diluted with an inert diluent 28 which is introduced via another conduit so that the diluted gaseous stream 26 has an insufficiency of oxygen to propagate a flame within itself. Suitable diluents which may be employed to dilute the oxygen-containing gaseous stream 26A, by way of example, are nitrogen, carbon dioxide, water vapor, and mixtures thereof.

The diluted gaseous stream 26 is mixed with the combustion effluent 22, resulting in full oxidation of the combustibles present but with minimum reformation of $NO_x$ in the combustion effluent in the oxidation zone 24 because high temperatures and high oxygen concentrations are avoided in said oxidation zone 24.

The gaseous stream 26A and the diluent 28 can be supplied from any suitable sources (not shown). For example, an effective amount of oxygen can be added to a recycle stream produced by the process, as will be described hereinafter with reference to FIG. 2, to provide a diluted gaseous stream containing the desired amount of oxygen for mixing with the combustion effluent 22 prior to injecting the combustion effluent into the oxidation zone 24.

Continuing with reference to FIG. 1, the oxidation zone 24 is preferably a refractory lined steel shell 30. An oxidation products stream 32 formed in the oxidation zone 24, comprising less than 1.5 percent oxygen, less than 200 ppm $NO_x$, and less than 50 ppm unoxidized hydrocarbons in Example 1 below, is discharged from the refractory lined steel shell 30 via a conduit and conveyed to a refractory lined steel vent stack 34 for venting to the atmosphere. The oxidation products stream vented to the atmosphere via the stack 34 is composed of nitrogen, carbon dioxide, water vapor and oxygen, the oxidation products stream being substantially free of smoke, combustibles and nitrogen oxides ($NO_x$) and environmentally safe.

Referring now to FIG. 2, the equipment components described above are shown therein and identically numbered so that only a brief description will be necessary as to the commonly depicted equipment. The burner 12 of the reduction zone 10 is fed the waste chemical stream 16, the air stream 18 and the fuel stream 20 which are combusted in he reaction shell 14 to discharge the combustion effluent 22. The oxygen-containing gaseous stream 26 is mixed with the combustion effluent 22, the combined streams passing to the oxidation zoner 24. The discharge from the oxidation zone 24 is the oxidation products stream 32.

A heat exchanger 40, such as a waste heat boiler, a superheater, an economizer or combination thereof, is operably connected to the conduit passing the oxidation products stream 32 so that the oxidation products are in heat exchange relationship with a coolant in the heat exchanger 40 for the recovery of useful energy, a typical coolant being steam. The cooled oxidation products stream 32A exiting the heat exchanger 40 may be routed to the vent stack 34 for venting to the atmosphere, or a portion of the cooled oxidation products stream 32A may be recycled to various stages of the process via a conduit 42 which communicates with the cooled oxidation products stream 32A.

To insure that the reduction zone 10 is maintained at a temperature less than 3000 F., a cooling fluid may be injected into the reaction shell 14 of the reduction zone 10 via a conduit 44 which communicates with the conduit 42 in FIG. 2. Of course, other sources of coolants, desirably an inert gas such as nitrogen, carbon dioxide, water vapor, or mixtures thereof, can be supplied from an independent source (not shown), but as shown, the cooling fluid 44 is a recycle stream consisting of a portion of the cooled oxidation products stream 32A. That is, a portion of the cooled oxidation products stream 32A, is passed via the conduits 42 and 44 to the reaction shell 14 and dispersed about the flame to cool the flame envelope, thus insuring that the reduction zone 10 is maintained at a temperature less than about 3000 F.

A second portion of the cooled oxidation products stream 32A may be passed via the conduit 42 to the conduit passing the gaseous stream 26A as the diluent 28. The diluted gaseous stream 26 is mixed with the combustion effluent 22. The remaining portion of the cooled oxidation products stream 32A, that which is not passed through the conduit 42, may be vented to the stack 34.

In order to more fully describe the improved process of the present invention for reducing chemically bound nitrogen in waste streams, the following examples are given. However, it is to be understood that the examples are for illustrative purposes and are not to be construed as limiting the present invention defined in the appended claims. For the sake of clarity, reference will be made to the process embodiment illustrated in FIGS. 1 and 2 of the drawings.

EXAMPLE 1

A waste stream 16 consisting of 150 mols per hour total and containing 2 mols per hour of nitrogen oxides ($NO_x$) is injected into the burner 12 of the reduction zone 10. Methane fuel 20 is introduced into the burner 12 at a rate of 13.75 mols per hour to provide a stoichiometric excess of hydrocarbon relative to the available oxygen (both free and bound as oxides of nitrogen expressed as $NO_2$, $NO_x$) of 25 percent. The temperature in the reaction shell 14 of the reduction zone 10 is 2600° F.

The reduction product stream, i.e. the combustion effluent stream 22, is removed from the reaction shell 14, and such stream contains a mixture of carbon dioxide, water vapor, nitrogen, carbon monoxide, and hydrogen. The combustion effluent stream 22, which has a temperature of 2600° F., is mixed with an air stream 26 diluted with a recycle diluent stream 28, consisting of oxidation effluent recovered from the oxidation zone 24, to produce an oxygen containing stream having 5.26 percent by volume oxygen. The flow rate of the air stream 26 is 40.91 mols per hour and the flow rate of the inert diluent stream 28 from conduit 42 is 171.42 mols per hour. The concentration of oxygen is sufficient to oxidize the combustibles present in the combustion effluent stream 22 and yield 1.5 percent oxygen in the oxidation products stream 32 recovered from the oxidation zone 24.

The temperature in the oxidation zone 24 is 1800° F. The oxidation products stream 32 withdrawn from the oxidation zone 24 passes through the heat exchanger 40 which cools the oxidation effluent to 400° F. The cooled oxidation effluent 32A, less the portion recycled through the conduit 42, flows to the vent stack 34 where it is vented to the atmosphere at a flow rate of 204.66 mols per hour. The oxidation effluent consists primarily of carbon dioxide, water vapor, nitrogen and oxygen.

The composition, flow rate and temperature of the various streams, at selected locations in the process described above, are tabulated in Table II.

contains a mixture of carbon dioxide, water vapor, nitrogen, carbon monoxide, and hydrogen. The combustion effluent stream 22, which has a temperature of 2600° F., is mixed with an air stream 26A which is diluted with a recycle diluent stream 28 consisting of

TABLE II

| | PROCESS CONDITIONS (FIG. 1) | | | | | |
|---|---|---|---|---|---|---|
| | NOx Containing Gas (16) | Hydrocarbon Fuel (20) | Combustion Effluent Stream (22) | Oxygen Containing Stream (26A) | Diluent Gas (28) | Oxidation Stream to Oxidation Zone (26A + 28) | Vent Stream to Atmosphere |
| Flow Rate (Mol/Hr) | 150.00 | 13.75 | 171.01 | 40.91 | 171.42 | 212.33 | 204.66 |
| Temperature (F.) | 200 | 80 | 2600 | 80 | 400 | 324 | 400 |
| Composition (Mol %) | | | | | | | |
| $N_2$ | 75.33 | — | 65.60 | 79.00 | 71.01 | 72.55 | 71.01 |
| $O_2$ | 12.67 | — | — | 21.00 | 1.51 | 5.26 | 1.51 |
| $NO_x$ | 2.00 | — | — | — | less than 150 ppm | — | less than 150 ppm |
| $CH_4$ | — | 100.00 | — | — | — | — | — |
| $CO_2$ | 3.33 | — | 10.39 | — | 9.16 | 7.40 | 9.16 |
| $H_2O$ | 6.67 | — | 17.57 | — | 18.32 | 14.79 | 18.32 |
| CO | — | — | 3.22 | — | — | — | — |
| $H_2$ | — | — | 3.22 | — | — | — | — |

The concentration of oxygen in the air stream passed to the oxidation zone 22 is 5.26 percent if all the oxidation products stream is recycled as diluent, and the concentration of combustibles, i.e. hydrogen and carbon monoxide, in the combustion effluent stream is 1.47 percent, respectively, for a total of 2.94 percent combustibles. In the event one introduces 200 percent of the stoichiometric amount of fuel into the reduction zone 10, the amount of combustibles, i.e., hydrogen and carbon monoxide in the combustion effluent, would be 4.9 percent, respectively, for a total of 9.8 percent combustibles.

EXAMPLE II

A waste stream 16 consisting of 90 mols per hour of air and containing 10 mols per hour of ammonia is injected into the burner 12 of the reduction zone 10. The hydrocarbon fuel 20 is methane, which is introduced into the burner 12 at a rate of 7.98 mols per hour to provide a stoichiometric excess of hydrocarbon relative to the available oxygen (both free and bound) of eighteen percent (18%). The temperature in the reaction shell 14 is controlled to 2600° F. by injecting 50.28 mols per hour of the flue gas 44 at 400° F. into the reaction shell 14.

The combustion effluent 22, is removed from the reaction shell 14 via the conduit 22, and such stream oxidation effluent recovered from the oxidation zone 24 to produce an oxygen containing stream having 10 percent by volume oxygen. The flow rate of the air stream 26 is 26.30 mols per hour and the inert diluent flow rate through conduit 28 is 143.00 mols per hour. The concentration of oxygen is sufficient to oxidize the combustibles in the combustion effluent stream 22 and yield 1.5% oxygen in the oxidation products effluent 32 recovered from the oxidation zone 24.

The temperature in the oxidation zone 24 is 1800° F. The oxidation products effluent 32 withdrawn from the oxidation zone 24 passes through the heat exchanger 40 which cools the oxidation products effluent 32 to 400° F. The oxidation products effluent 32, less the portion recycled as diluent and cooling fluid through the conduit 42, flows to the vent stack 34 where it is vented to the atmosphere at a rate of 137.78 mols per hour. The oxidation products effluent 32 consists primarily of carbon dioxide, water vapor, nitrogen, and oxygen. The flow rate of the portion of the cooled oxidation effluent through conduit 42 for use as cooling fluid and diluent, as set forth above, is 193.28 mols per hour.

The composition, flow rate and temperature of the various streams, at selected locations in the process described above, are tabulated in Table III which follows.

TABLE III

| | PROCESS CONDITIONS (FIG. 2) | | | | | | |
|---|---|---|---|---|---|---|---|
| | NOx Containing Gas (16) | Hydrocarbon Fuel (20) | Cooling Fluid to Reduction Zone (44) | Combustion Products Stream (22) | Oxygen Containing Stream (26A) | Oxidation Stream to Oxidation Zone (26A + 28) | Vented Oxidation Products Stream |
| Flow Rate (Mol/Hr) | 100.00 | 7.98 | 50.28 | 164.07 | 26.30 | 143.00 | 137.78 |
| Temperature (F.) | 80 | 80 | 400 | 2600 | 80 | 400 | 400 |
| Composition (Mol %) | | | | | | | |
| $N_2$ | 71.10 | — | 70.40 | 67.43 | 79.00 | 70.40 | 70.40 |
| $O_2$ | 19.90 | — | 1.50 | — | 21.00 | 1.50 | 1.50 |
| $NH_3$ | 10.00 | — | — | — | — | — | — |
| $CH_4$ | — | 100.00 | — | — | — | — | — |
| $CO_2$ | — | — | 5.79 | 5.91 | — | 5.79 | 5.79 |
| $H_2O$ | — | — | 22.47 | 22.31 | — | 22.47 | 22.47 |

TABLE III-continued

| | PROCESS CONDITIONS (FIG. 2) | | | | | |
|---|---|---|---|---|---|---|
| | NOx Containing Gas (16) | Hydrocarbon Fuel (20) | Cooling Fluid to Reduction Zone (44) | Combustion Products Stream (22) | Oxygen Containing Stream (26A) | Oxidation Stream to Oxidation Zone (26A + 28) | Vented Oxidation Products Stream |
| CO | — | — | — | 1.49 | — | — | — |
| $H_2$ | — | — | — | 2.86 | — | — | — |

EXAMPLE III

An ammonia vent stream 16 was synthesized by combining 1.95 mols per hour of ammonia with 104.10 mols per hour of air. The ammonia was monitored by orifice pressure drop and controlled with a hand valve. The air was monitored by annubar differential pressure reading and controlled by a manual damper. Fuel gas 20 was combined with the ammonia/air stream across a spin type burner 12 at a rate of 13.58 mols per hour and monitored by pressure drop across the orifice openings in the drilled tip.

The fuel gas 20 was controlled by a manual hand valve to an amount in excess of the available oxygen in the ammonia/air stream 16 to create an overall reducing atmosphere 10 as monitored by a teledyne oxygen/combustibles analyzer. The temperature in this zone 10 was 2560 F.

Secondary oxidation air 26A at a rate of 33.6 mols per hour was monitored by an annubar and controlled by a manual damper. Diluent stream 28 was mixed with the secondary oxidation air 26A at a rate of 104.4 mol per hour as monitored by orifice differential pressure. The excess combustibles were oxidized in zone 24 at a temperature of 1422 F.

Gas samples of the ammonia/air stream 16, 18 the combustion effluent 22, and oxidation products streams 32 were analyzed by gas chromatograph to determine the composition reported in the test data Table IV. The $NO_x$ data was determined analytically by EPA test method 7.

The composition, flow rate and temperature of the various streams, at selected locations in the process results described above, are tabulated in Table IV which follows.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. An improved process for disposing of an industrial waste stream containing chemically bound nitrogen compounds comprising:
    burning the industrial waste stream containing chemically bound nitrogen compounds at a temperature greater than about 2000° F. in the presence of a stoichiometric excess of an amount of a reducing agent required for stoichiometric reduction of available oxygen to provide a combustion effluent substantially free of oxides of nitrogen; and
    reacting the combustion effluent with an effective amount of a dilute oxygen containing gaseous stream to achieve oxidation of the combustibles present in the combustion effluent at a temperature of about 1600° F. to about 1800° F. and without effecting flame propagation within the dilute oxygen containing gaseous stream to produce an oxidation effluent substantially free of oxides of nitrogen.

2. The process of claim 1 wherein the dilute oxygen containing stream contains less than about 21 volume percent oxygen.

3. The process of claim 2 wherein the effective amount of the oxygen in the gaseous stream is a stoichiometric excess, based on the amount of the combustibles present in the combustion effluent.

4. The process of claim 3 wherein the chemically bound nitrogen compounds are selected from the group consisting of oxides of nitrogen ammonia and compounds in which a nitrogen atom is chemically bonded

TABLE IV

| | PROCESS CONDITIONS | | | | | |
|---|---|---|---|---|---|---|
| | Combined Streams (16,18) | Fuel Stream (20) | Air Stream (26A) | Stream Diluent (28) | Combustion Effluent (22) | Oxidation Products Stream (32) |
| Flow Rate (Mol/Hr) | 106.05 | 13.58 | 27.6 | 104.44 | — | — |
| Temperature (F.) | 70 | 70 | 70 | 406 | 2560 | 1422 |
| Composition (Mol %) | | | | | | |
| $N_2$ | 75.81 | — | 77.67 | — | 66.10 | 41.68 |
| $O_2$ | 20.18 | — | 20.58 | — | — | 7.15 |
| $NH_3$ | 1.84 | — | — | — | — | — |
| $CH_4$ | — | 100 (Assumed) | — | — | — | — |
| $CO_2$ | — | — | — | — | 10.66 | 3.66 |
| $H_2O$ | 2.17 | — | 1.75 | 100 | 18.42 | 47.50 |
| CO | — | — | — | — | 2.07 | — |
| $H_2$ | — | — | — | — | 2.13 | — |
| $NO_x$ | — | — | — | — | 87 ppm | 71 ppm | to a carbon atom.

5. The process of claim 1 or 3 which further comprises cooling the oxidation effluent in a heat exchanger to recover heat energy.

6. The process of claim 5 which further comprises recycling a portion of the cooled oxidation effluent as an inert carrier gas for the dilution of the oxygen containing flameless stream employed to achieve flameless oxidation of the combustibles present in the combustion effluent and prevent flame propagation.

7. The process of claim 5 which further comprises recycling a portion of the cooled oxidation effluent as a cooling gas for maintaining the temperature of the waste stream at a temperature greater than about 2000° F. and less than about 3000° F. during the burning of the waste stream.

8. The process of claim 5 which further comprises recycling a portion of the cooled oxidation effluent as a coolant gas to the oxidation zone to maintain the temperature of the combustion effluent at the temperature of from about 1600° F. to about 1800° F. during oxidation of the combustion effluent.

9. The process of claim 1 wherein the burning of the waste stream is carried out at a temperature greater than 2000° F. and less than 3000° F.

10. The process of claim 9 which further comprises venting at least a portion of the oxidation effluent to the atmosphere.

11. The process of claim 1 wherein the reducing agent is a hydrocarbon, the amount of the hydrocarbon added during the burning of the waste stream being less than about 200 percent of the stoichiometric amount required for the stoichiometric reduction of available oxygen present during the burning of the waste stream.

12. The process of claim 11 wherein the hydrocarbon is a low molecular weight hydrocarbon.

13. The process of claim 12 wherein the low molecular weight hydrocarbon is selected from the group consisting of methane, ethane, and natural gas.

14. A process for reducing the concentration of oxides of nitrogen in an effluent stream so that the effluent stream can be vented into the atmosphere comprising:

burning a waste stream containing chemically bound nitrogen compounds with effective amounts of air and a reducing agent at a temperature in the range of greater than about 2000° F. and less than about 3000° F. to provide a combustion effluent, the reducing agent being present in an amount to provide a stoichiometric excess, based on the amount of available oxygen, but less than 200 percent of such stoichiometric amount; and contacting the combustion effluent with an effective amount of an oxygen containing gaseous stream to achieve oxidation of combustibles present in the combustion effluent without effecting flame propagation at a temperature in the range of from about 1600° F. to about 1800° F. so as to minimize formation of oxides of nitrogen and produce an oxidation effluent, the oxygen containing gaseous streeam having a stoichiometric excess of oxygen based on the amount of combustibles present in the effluent and less than 21 volume percent oxygen.

15. The process of claim 14 wherein the chemically bound nitrogen compounds are selected from the group consisting of oxides of nitrogen, ammonia, and compounds in which a nitrogen atom is chemically bonded to a carbon atom.

16. The process of claim 15 which further comprises cooling the oxidation effluent in a heat exchanger to recover heat energy.

17. The process of claim 15 which further comprises recycling a portion of the cooled oxidation effluent as an inert carrier gas for dilution of the oxygen containing gaseous stream.

18. The process of claim 15 or 17 which further comprises recycling a portion of the cooled oxidation effluent as a coolant gas for maintaining the burning temperature of the waste stream at a temperature greater than about 2000° F. and less than about 3000° F.

19. The process of claim 15 which further comprises recycling a portion of the cooled oxidation effluent as coolant gas to maintain the temperature of the combustion effluent stream at the temperature of from about 1600° F. to about 1800° F. during oxidation of the combustion effluent.

20. The process of claim 14 which further comprises venting the oxidation effluent to the atmosphere.

21. The process of claim 14 wherein the reducing agent is a low molecular weight hydrocarbon.

22. The proces of claim 21 wherein the low molecular weight hydrocarbon is selected from the group consisting of methane, ethane, and natural gas.

* * * * *

UNITED STATES PATENT AND TRADEMARK OFFICE
CERTIFICATE OF CORRECTION

PATENT NO. : 4,519,993

DATED : May 28, 1985

INVENTOR(S) : Eugene C. McGill and Ronald D. Bell

It is certified that error appears in the above-identified patent and that said Letters Patent is hereby corrected as shown below:

In column 1, line 21, the word "and" should read --are--. In column 4, line 24, the word "exchange" should read --exchanger--. In column 5, line 21, the word "zones" should read --zone--. In column 6, line 21 "hydrocarbons" should read --hydrocarbon--. In column 6, line 61, reading "1600° F.," should read --1600° F.--. In column 7, line 50, the word "he" should read --the--. In column 7, line 54, the word "zoner" should read --zone--. In column 13, line 7, reading as follows:
"taining flameless stream employed to achieve flameless" should read as follows:
--taining stream employed to achieve--.

Signed and Sealed this

Twenty-fifth Day of March 1986

[SEAL]

Attest:

DONALD J. QUIGG

Attesting Officer

Commissioner of Patents and Trademarks